(12) United States Patent
Kolen et al.

(10) Patent No.: US 10,790,919 B1
(45) Date of Patent: Sep. 29, 2020

(54) PERSONALIZED REAL-TIME AUDIO GENERATION BASED ON USER PHYSIOLOGICAL RESPONSE

(71) Applicant: Electronic Arts Inc., Redwood City, CA (US)

(72) Inventors: John Kolen, Foster City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/365,499

(22) Filed: Mar. 26, 2019

(51) Int. Cl.
| | |
|---|---|
| *G06F 17/00* | (2019.01) |
| *H04H 60/46* | (2008.01) |
| *G06N 3/08* | (2006.01) |
| *G06F 3/16* | (2006.01) |

(52) U.S. Cl.
CPC ............ *H04H 60/46* (2013.01); *G06F 3/165* (2013.01); *G06N 3/08* (2013.01)

(58) Field of Classification Search
CPC ......... G06F 3/165; A61B 5/121; A61B 5/128; H04R 25/70; H04R 25/75
See application file for complete search history.

(56) References Cited

U.S. PATENT DOCUMENTS

| | | | |
|---|---|---|---|
| 5,142,961 A | 9/1992 | Paroutaud | |
| 5,315,060 A | 5/1994 | Paroutaud | |
| 5,648,627 A | 7/1997 | Usa | |
| 5,808,219 A | 9/1998 | Usa | |
| 6,084,168 A | 7/2000 | Sitrick | |
| 6,297,439 B1 | 10/2001 | Browne | |
| 6,353,174 B1 | 3/2002 | Schmidt | |
| 6,482,087 B1 | 11/2002 | Egozy | |
| 6,898,729 B2 | 5/2005 | Virolainen | |
| 8,119,898 B2 | 2/2012 | Bentson | |

(Continued)

FOREIGN PATENT DOCUMENTS

WO  WO 2018/122730  7/2018

*Primary Examiner* — Joseph Saunders, Jr.
(74) *Attorney, Agent, or Firm* — Knobbe, Martens, Olson & Bear, LLP

(57) ABSTRACT

Systems and methods are provided for personalized real-time audio generation based on user physiological response. An example method includes obtaining hearing information associated with a user's hearing capabilities, the hearing information indicating one or more constraints on the user's hearing, and the hearing information being determined based on one or more hearing tests performed by the user; requesting listening history information from one or more music streaming platforms, the listening history information indicating, at least, music playlists to which a user created or is subscribed; determining, based on the listening history information, a style preference associated with the user; generating, utilizing one or more machine learning models, personalized music based on the hearing information and the style preference, wherein the personalized music comports with the constraints, and wherein the system is configured to provide the personalized music for output via a user device of the user.

20 Claims, 7 Drawing Sheets

(56) References Cited

U.S. PATENT DOCUMENTS

| | | |
|---|---|---|
| 8,653,349 B1 | 2/2014 | White |
| 9,418,636 B1 | 8/2016 | Malluck |
| 9,866,731 B2 | 1/2018 | Godfrey |
| 10,395,666 B2 | 8/2019 | Cook |
| 2002/0005109 A1 | 1/2002 | Miller |
| 2002/0134222 A1 | 9/2002 | Tamura |
| 2003/0064746 A1* | 4/2003 | Rader ............. H04R 25/70 455/550.1 |
| 2003/0094093 A1 | 5/2003 | Smith |
| 2003/0164084 A1 | 9/2003 | Redmann |
| 2003/0188626 A1 | 10/2003 | Kriechbaum et al. |
| 2004/0131200 A1* | 7/2004 | Davis ............. A61B 5/121 381/73.1 |
| 2005/0260978 A1* | 11/2005 | Rader ............. H04R 25/70 455/418 |
| 2006/0180005 A1 | 8/2006 | Wolfram |
| 2007/0028750 A1 | 2/2007 | Darcie |
| 2007/0039449 A1 | 2/2007 | Redmann |
| 2007/0140510 A1 | 6/2007 | Redmann |
| 2007/0245881 A1 | 10/2007 | Egozy |
| 2007/0261535 A1 | 11/2007 | Sherwani et al. |
| 2008/0113797 A1 | 5/2008 | Egozy |
| 2008/0165980 A1* | 7/2008 | Pavlovic ............. H03G 9/005 381/60 |
| 2009/0066641 A1 | 3/2009 | Mahajan |
| 2009/0071315 A1 | 3/2009 | Fortuna |
| 2009/0320669 A1 | 12/2009 | Piccionelli |
| 2014/0254828 A1* | 9/2014 | Ray ............. H03G 5/165 381/103 |
| 2014/0334644 A1* | 11/2014 | Selig ............. G06F 3/165 381/108 |
| 2015/0143976 A1 | 5/2015 | Katto |
| 2015/0179157 A1 | 6/2015 | Chon et al. |
| 2016/0379611 A1 | 12/2016 | Georges et al. |
| 2017/0005634 A1* | 1/2017 | Raz ............. H03G 9/14 |
| 2017/0092247 A1 | 3/2017 | Silverstein |
| 2017/0110102 A1 | 4/2017 | Colafrancesco et al. |
| 2017/0140743 A1 | 5/2017 | Gouyon et al. |
| 2017/0357479 A1* | 12/2017 | Shenoy ............. G06F 3/167 |
| 2018/0271710 A1* | 9/2018 | Boesen ............. A61M 21/00 |
| 2018/0322854 A1 | 11/2018 | Ackerman et al. |
| 2018/0349492 A1* | 12/2018 | Levy ............. G06N 3/084 |
| 2019/0018644 A1* | 1/2019 | Kovacevic ............. G06F 3/165 |
| 2019/0237051 A1 | 8/2019 | Silverstein |

\* cited by examiner

US 10,790,919 B1

PERSONALIZED REAL-TIME AUDIO GENERATION BASED ON USER PHYSIOLOGICAL RESPONSE

TECHNICAL FIELD

The present disclosure relates to systems and techniques for generating audio. More specifically, this disclosure relates to personalizing audio generation based on user hearing information.

BACKGROUND

Streaming music platforms have enabled users to select potentially any song for output via their user devices. For example, a user may specify a certain artist or song via an application on the user's device. The application may trigger a request for the specified artist or song to a back-end server, for example over the internet. With respect to a specified song, the back-end server may then obtain the song and provide (e.g., stream) the song to the application for output. With respect to a specified artist, the back-end server may access stored information associated with the artist. Example information may include one or more songs associated with the artist, one or more albums associated with the artist, biographical information, and so on. The application may then receive this information and present it via a display of the user device. In this way, users may quickly cycle through songs and thus listen to disparate genres of music.

However, certain users may find it uncomfortable to listen to music streamed from the streaming music platforms. For example, a user with a particular hearing impairment (e.g., tinnitus) may find certain music to be grating due to a persistent perceived tone caused by the tinnitus. In this example, the user may avoid utilizing such applications. Additionally, certain users may enjoy certain genres of music but find that elements of the music are difficult to hear. For example, a user with a hearing impairment, for which the user has difficulty hearing a certain frequency range, may be unable to properly hear certain aspects of the music. An example aspect may include an instrument which typically plays within the certain frequency range. Another example aspect may include a portion of a melody which is inaudible to the user.

The above-described users may therefore struggle with utilizing such streaming music platforms. Thus, the increased access to music afforded by streaming music platforms may be lost on these users.

SUMMARY OF CERTAIN EMBODIMENTS

Particular embodiments of the subject matter described in this specification can be implemented so as to realize one or more of the following advantages. Utilizing the techniques described herein, music may be generated (e.g., via machine learning techniques) and personalized for a user. As will be described, the music may be personalized utilizing (1) physiological hearing information of the user and (2) a stylistic preference of the user. For example, a streaming music platform may obtain information describing one or more hearing impairments of the user. The streaming music platform may then determine a musical style preference of the user. The streaming music platform, such as via a particular system described herein, may then generate personalized music based on the hearing information and stylistic preference. In this way, the user may stream music which has been generated to comport with the user's hearing impairments.

In some embodiments, the generated music may be provided to a device being utilized by the user. For example, the device may execute an application associated with the streaming music platform. In this example, the application may cause output of the personalized music to the user. As will be described, the user may indicate that music corresponding to a different style or genre is to be generated. In response, the streaming music platform may generate updated personalized music. Thus, the user may receive music personalized to the user's specific hearing and also the user's, potentially shifting, taste in music.

In some embodiments, the music may be provided for inclusion in an electronic game. As an example, the music may be personalized for a specific user playing an electronic game. In this example, the music may be utilized as music for the electronic game (e.g., background music). The music may also be provided for inclusion in a television show or movie being viewed by the user. For example, television shows or movies may include the same pre-recorded music for each viewer. In contrast, utilizing the techniques described herein music may be personalized for different users according to the users' hearing capabilities. As will be described, the personalized music may be generated based on existing music, or musical cues, created by a composer. For example, a system described herein may utilize machine learning techniques to generate personalized music from the existing music or musical cues. In this way, users may hear music which is personalized to them and which shares similar motifs or themes, evokes similar emotions, and so on.

It may be appreciated that hearing capabilities of users may substantially vary. As an example, due to hearing loss a user may have limited hearing across a particular range of frequencies. In this example, the particular range may represent a frequency hole for which the user has limited perception. As another example, a user may have limited hearing for frequencies greater, or lower, than a threshold. As another example, a user may be particularly susceptible to certain sounds, frequencies, and so on. Thus, this user may find it difficult to listen to certain music which includes these sounds, frequencies, and so on. Since these examples may randomly appear within music, a user may be discouraged from using streaming music platforms.

As will be described, a system described herein may obtain hearing information associated with a user. The hearing information may describe hearing capabilities of the user, such as any hearing ailments, deviations from a hearing norm, and so on. For example, the system may receive information from a hearing test application. Examples of a hearing test may include pure tone audiometry, Weber test, Rinne test, Hearing in Noise test, Words-in-Noise test, Modified Rhyme Test, and so on. The hearing test application may optionally be included in a music streaming application.

Based on the user performing one or more hearing tests, the system may receive hearing information for the user. The hearing information, as described above, may thus indicate constraints associated with music generation. For example, if the hearing information indicates that the user has limited hearing within a certain frequency range, then the system may generate music which avoids this frequency range.

Advantageously, the system may therefore generate personalized music for a user which comports with the user's empirically determined hearing capabilities. Additionally, the generated music may be generated to reflect, or otherwise correspond with, stylistic preferences of the user. To determine a style preference, the system described herein may access one or more music streaming platforms of a user. The system may obtain information indicative of musical preferences of the user, such as a listening history, playlists created or subscribed to by the user, and so on. The system may then determine a style or genre preference of the user. Based on this style preference, the system may utilize machine learning techniques to generate music which comports with this style preference.

The techniques described herein additionally improve upon the functioning of streaming music platforms. As described above, prior techniques for providing music to users lacked technical ability to adjust for the specific hearing responses of the users. Thus, these users may suffer discomfort. Additionally, since certain users may be unable to hear portions of music, streaming these portions may unnecessarily consume bandwidth, power, device resources, and so on. In contrast, utilizing the techniques described herein a user experience associated with streaming music may be improved. For example, users may listen to realistically generated music which addresses, and comports with, the users' disparate hearing capabilities.

With respect to generating audio, it may be appreciated that a first example scheme may merely avoid certain frequencies, tones, sounds, and so on. For this first example scheme, one or more machine learning models (e.g., convolutional neural networks, recurrent neural networks, and so on) may generate music. The generated music may then be adjusted according to the constraints associated with a user's hearing. For example, certain generated sounds may be adjusted in frequency (e.g., lowered or increased by an octave), certain other generated sounds may be removed entirely, and so on. However, this first example scheme may produce unnatural sounding music due to the ad hoc nature of correcting for user hearing.

Optionally, the system described herein may improve upon this first example scheme. As an example, a user may have tinnitus associated with a certain, or approximate, tone (e.g., frequency). In this example, the system may generate music which utilizes the tone in the music. For example, the tone may be set as a note to be utilized when generating music. As another example, the system may utilize the tone as a tonic center. This tone may optionally not correspond to a tone included in a generally accepted pitch standard. An example pitch standard may set 'A' as being 440 Hz, such as in ISO 16. Advantageously, the machine learning techniques described herein may incorporate the tone and thus create an otherwise non-existent pitch standard.

In this way, the system may improve upon prior schemes to generate music. Additionally, via the user-experience enhancements described above, the system may increase usability of such music generation schemes.

The systems, methods, and devices of this disclosure each have several innovative aspects, no single one of which is solely responsible for the all of the desirable attributes disclosed herein.

One embodiment discloses a method comprising: by a system of one or more computers, obtaining hearing information associated with a user's hearing capabilities, the hearing information indicating one or more constraints, and the hearing information being determined based on one or more hearing tests performed by the user; requesting listening history information from one or more music streaming platforms, the listening history information indicating, at least, music playlists to which a user created or is subscribed; and generating, utilizing one or more machine learning models, personalized music based on the hearing information and the listening history information, wherein the personalized music comports with the constraints, and wherein the system is configured to provide the personalized music for output via a user device of the user.

Various embodiments of the method may include one, all, or any combination of the following features. Hearing information indicates that the user has tinnitus, or wherein the hearing information indicates a frequency range associated with reduced hearing capability. The information indicates that the user has tinnitus, and wherein generating personalized music comprises: identifying, from the hearing information, a tone associated with the user's tinnitus; and generating personalized music, such that the one or more machine learning models set the identified tone as a musical note for utilization in the personalized music. Remaining musical notes utilized in the personalized music are associated with respective intervals from the identified tone. The information indicates a frequency range, and wherein generating personalized music comprises: selecting, via the one or more machine learning models, instruments associated with musical notes outside of the frequency range; and generating personalized music utilizing the selected instruments. Requesting listening history information comprises: receiving, from a user device executing the electronic game, information indicating initiation of the electronic game; obtaining authentication information associated with the user; and requesting the listening history information utilizing the authentication information. The method further comprises grouping a threshold number of songs identified in the listening history information; and determining a style preference based on the threshold number of songs, wherein the generated music is in a style in accordance with the determined style preference. The determined style preference comprises an assigned weight to each of a plurality of musical styles based on the threshold number of songs. The one or more machine learning models comprise a recurrent neural network or a convolutional neural network.

One embodiment discloses a system comprising one or more computers and computer-storage media storing instructions that when executed by the one or more computers, cause the one or more computers to perform operations comprising: obtaining hearing information associated with a user's hearing capabilities, the hearing information indicating one or more constraints, and the hearing information being determined based on one or more hearing tests performed by the user; requesting listening history information from one or more music streaming platforms, the listening history information indicating, at least, music playlists to which a user created or is subscribed; and generating, utilizing one or more machine learning models, personalized music based on the hearing information and the listening history information, wherein the personalized music comports with the constraints, and wherein the system is configured to provide the personalized music for output via a user device of the user.

Various embodiments of the system may include one, all, or any combination of the following features. The hearing information indicates that the user has tinnitus, or wherein the hearing information indicates a frequency range associated with reduced hearing capability. The information indicates that the user has tinnitus, and wherein generating personalized music comprises: identifying, from the hearing information, a tone associated with the user's tinnitus; and generating personalized music, such that the one or more machine learning models set the identified tone as a musical note for utilization in the personalized music. Remaining musical notes utilized in the personalized music are associated with respective intervals from the identified tone. The information indicates a frequency range, and wherein generating personalized music comprises: selecting, via the one or more machine learning models, instruments associated with musical notes outside of the frequency range; and generating personalized music utilizing the selected instruments. The one or more machine learning models comprise a recurrent neural network or a convolutional neural network.

One embodiment discloses non-transitory computer storage media storing instructions that when executed by a system of one or more computers, cause the one or more computers to perform operations comprising: obtaining hearing information associated with a user's hearing capabilities, the hearing information indicating one or more constraints, and the hearing information being determined based on one or more hearing tests performed by the user; requesting listening history information from one or more music streaming platforms, the listening history information indicating, at least, music playlists to which a user created or is subscribed; and generating, utilizing one or more machine learning models, personalized music based on the hearing information and the listening history information, wherein the personalized music comports with the constraints, and wherein the system is configured to provide the personalized music for output via a user device of the user.

Various embodiments of the computer storage media may include one, all, or any combination of the following features. The hearing information indicates that the user has tinnitus, or wherein the hearing information indicates a frequency range associated with reduced hearing capability. The information indicates that the user has tinnitus, and wherein generating personalized music comprises: identifying, from the hearing information, a tone associated with the user's tinnitus; and generating personalized music, such that the one or more machine learning models set the identified tone as a musical note for utilization in the personalized music. The information indicates a frequency range, and wherein generating personalized music comprises: selecting, via the one or more machine learning models, instruments associated with musical notes outside of the frequency range; and generating personalized music utilizing the selected instruments. The one or more machine learning models comprise a recurrent neural network or a convolutional neural network.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

Like reference numbers and designations in the various drawings indicate like elements.

DETAILED DESCRIPTION

Overview

Figure 1:
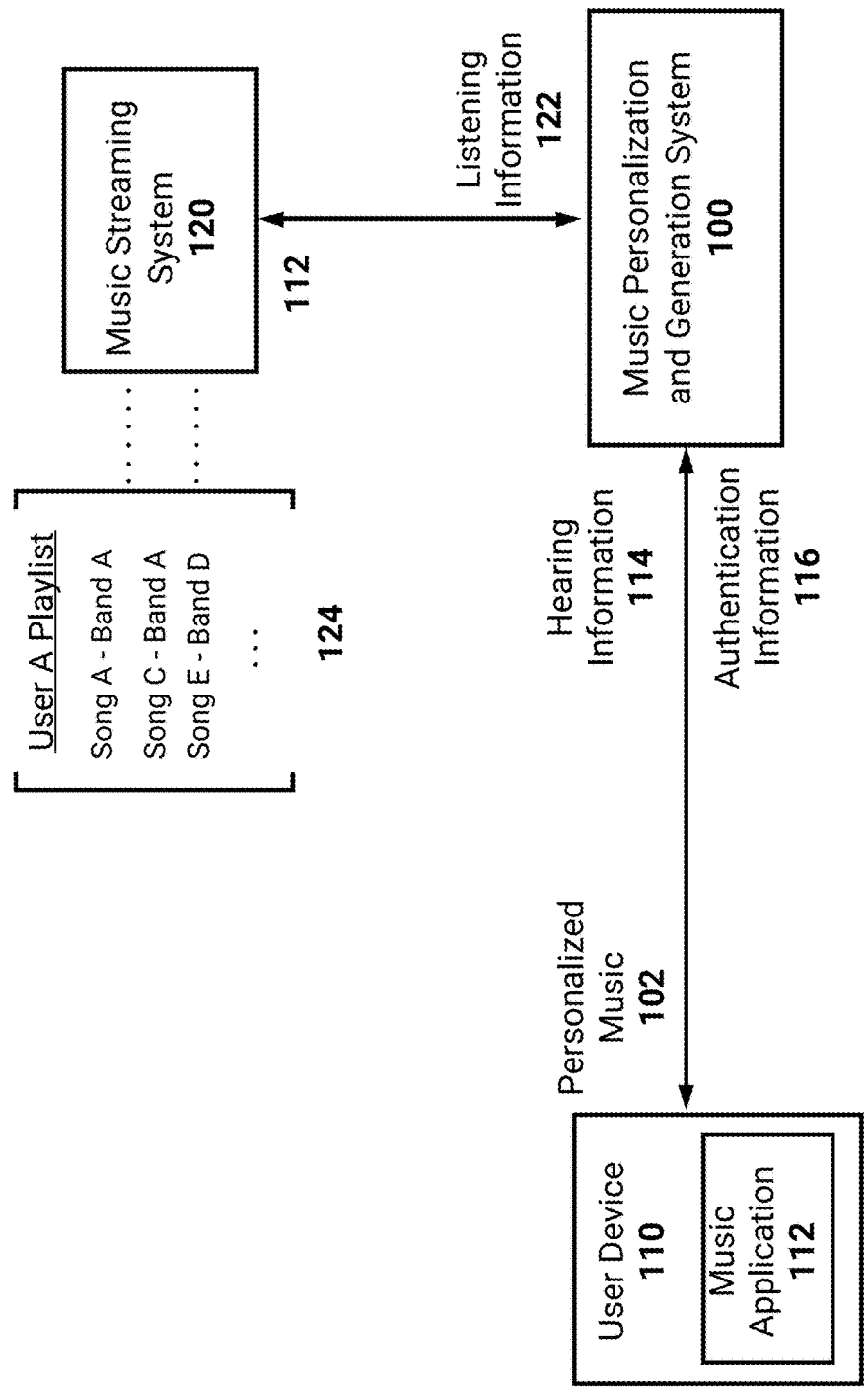
FIG. 1 is a block diagram illustrating an example music personalization and generation system generating personalized music.

This specification describes techniques to generate music for users which is personalized to each user's specific hearing capabilities. It may be appreciated that certain people may have hearing ailments, which may affect their ability to, or enjoyment of, listening to music. For example, a person may have limited hearing capability for sounds associated with a frequency spectrum in a certain range. Thus, this frequency spectrum may represent a hole in the person's hearing. As another example, a person may have extra sensitive hearing capability for sounds within the frequency spectrum. Thus, this frequency spectrum may be uncomfortable to the person. Additionally, a person may have tinnitus such that a substantially persistent tone or sound may be perceived by the person. Tinnitus may manifest periodically and may be perceived as coming from one ear or both ears. Music streaming applications, at present, do not account for such hearing ailments. Thus, the user experience for users with these example hearing ailments may be poor.

As will be described, machine learning techniques may be leveraged by a system described herein to generate music for auditory output to different users. The generated music may be personalized for each user, for example personalized to the user's hearing capabilities. As will be described, the user's hearing capabilities may be determined based on performance of one or more hearing tests. The system may provide the personalized music to the user, for example via a music streaming application on the user's device. Since the system may leverage empirically determined hearing capabilities of each user, the generated music may provide a greater user experience for the user.

As described herein, a system may determine, or obtain, hearing information for a user. Hearing information, in this specification, may be construed broadly and include information indicative of the user's hearing capabilities. As described above, hearing information may indicate particular hearing ailments. In some embodiments, hearing information may include, or indicate information extracted from, scans, models, and so on, of the user's ear canal. In these embodiments, the system may ingest scans or models, and determine, for example, information indicative of conductive hearing loss issues. In some embodiments, hearing information may include user preferences. For example, a user may disfavor music which includes higher frequencies.

As another example, the user may disfavor music which includes a melody line played at a higher frequency. Additional user preferences may relate to frequency, tempo, time signature, and so on.

The system described herein may personalize music based, at least in part, on the above-described hearing information. As described herein, personalizing music may refer to generating music utilizing machine learning techniques. An example of a machine learning technique may include utilization of recurrent neural networks, such as networks which include long short-term memory units, gated recurrent units, and so on. Another example of a machine learning technique may include utilization of convolutional neural networks. For example, the convolutional neural network may utilize WaveNets. It may be appreciated that the machine learning techniques may therefore generate music which has not previously been recorded. These example machine learning techniques will be described in more detail below, with respect to at least FIG. 2.

With respect to generating music, the machine learning techniques described herein may generate audio which may simulate instruments (e.g., acoustic or electronic instruments), sounds, and so on. For example, the system may generate classical music personalized to a user's hearing capabilities. In this example, the machine learning techniques may generate audio which includes simulations of classical instruments (e.g., violins, double bass, and so on). The machine learning techniques described herein may also generate musical instrument digital instrument (MIDI) notation. For example, classical music may be generated based on specification of specific musical notes. Additionally, the specific musical notes may be indicated as being performed by disparate instruments. Thus, utilizing this MIDI notation the system described herein may generate resulting audio.

In some embodiments, and as will be described, personalizing music may refer to adjusting, or expanding upon, music which has been previously written or recorded. For example, a composer may create a musical score or may record music. With respect to a musical score, the musical score may be played utilizing musical instrument digital instrument (MIDI) synthesizers. The system described herein may generate music based on the musical score, such that the generated music comports with hearing information of a user. For example, the musical score may indicate that particular musical notes are to be played in a certain octave. This octave may be difficult for the user to hear, for example it may be higher than a threshold frequency. In this example, the system may adjust the musical notes to be played in a different octave.

Similar to the above-description, the system may leverage machine learning techniques to adjust the music. For example, and with respect to a musical score, the system may ingest the musical score and generate music based on the musical score. The musical score may therefore represent an input musical cue, from which the system may expand upon. As another example, and with respect to recorded music, the system may ingest the audio (e.g., raw audio information). The system may then generate music based on the ingested audio. As an example, the system may utilize the hearing information as an input, along with the audio, to a convolutional neural network. The system may then generate personalized music as a corresponding output.

In this way, the system may utilize hearing information of a user to personalize music for the user. Advantageously, the system may utilize a musical preference of the user (referred to herein as a 'style preference') to further personalize music. A style preference of a user may indicate information indicative of preferred musical genres to which the user listens. As is known, music may be classified according to disparate features or qualities. These classifications may form categorizations of music, such as genres. Example genres may include symphonic music (e.g., classical, impressionist, modern), jazz, hip-hop, rock including sub-genres thereof, electronic music, and so on. As will be described, the system may determine a style preference of a user and then generate music of a same, or similar, musical style. In this way, the music being output to the user may be customized according to the user's preferences.

The system described herein may determine a style preference of a user via accessing the user's accounts with one or more music streaming platforms. Example music streaming platforms may include SPOTIFY, APPLE MUSIC, and so on. The system may receive authentication information from the user, such as a user name/password, authentication token, and so on. This authentication information may be utilized to access the user's music streaming platforms. In all situations in which personal information, or authentication information, of a user is utilized, it may be appreciated that these uses may be 'opt-in'. Thus, users may be required to affirmatively indicate that they wish to receive personalized music.

To provide authentication information, the user may utilize a user interface to specify the authentication information for use by the system. For example, the user interface may represent a log-in screen associated with a music streaming platform. Certain music streaming platforms may additionally enable the sharing of music listening information with outside systems, users, social media platforms, and so on. For example, as a user utilizes a music streaming platform, the listening history may be broadcast by the platform. This broadcast listening history may, for example, be consumed by a social media platform. The social media platform may thus present the user's listening history in substantially real-time, for example in a social network feed. In this way, friends of the user on the social media platform may view the music being listened to by the user. Similarly, the user may indicate that the system described herein is to receive such broadcast listening history. The system may then aggregate the listening history to determine a style preference of the user.

To determine the style preference, the system may optionally access metadata information associated with music being streamed by the user. For example, the metadata information may indicate a genre of each song or a genre of an artist. The system may then determine the genres which are being listened to by the user. As will be described, the system may generate music based on these determined genres. In some embodiments, the system may indicate that the style preference represents a threshold number of songs listened to by the user. For example, the system may access the user's listening history and select a threshold number of the most recently played songs. As will be described, the system may generate music based on these threshold number of songs. For example, the resulting music may represent a combination of features, or styles, extracted from the threshold number of songs by the system.

The determined style preference for the user may be utilized, as described above, to generate personalized music for the user which comports with the user's hearing information. In this way, the system may determine that the user prefers to listen to hip-hop. However, based on the user's hearing information the system may identify that the user has been diagnosed with tinnitus. Thus, it may be difficult for the user to listen to pre-recorded hip-hop while the tinnitus is acutely affecting the user. During these times, the user may instead prefer to receive personalized music generated by the system. As will be described, the user may quickly toggle from listening to pre-recorded music to listening to music generated by the system. Thereafter, for example if the user is not acutely being affected by tinnitus, the user may prefer to listen to pre-recorded hip-hop music.

While the description above focused on utilizing music streaming applications, it may be understood that the techniques described herein may be applied to different use cases. For example, music may be generated for utilization in electronic games. In these examples, the music in an electronic game may be adjusted by the system to comport with a user's hearing information. As another example, music may be generated for utilization in streaming movies or television. In this example, a user of, for example, a video streaming platform may view a movie or television show via the platform. During the movie, music may be generated which comports with the user's hearing information.

Additionally, while the description herein focuses on utilizing machine learning models to generate music, it may be appreciated that different techniques may be utilized. For example, music generation could be performed using constraint satisfaction, logic programming, and planning. Hearing information may be encoded in decision trees and random forests, or suffix trees, or other symbolic approaches.

Example Block Diagrams

FIG. 1 is a block diagram illustrating an example music personalization and generation system 100 generating personalized music 102. As described above, the music personalization and generation system 100 may receive hearing information 114 from a user of a user device 110. Additionally, and as an example, the system may receive listening information 122 from a music streaming system 120 to determine a style preference of the user. Based on this received information, the music personalization and generation system 100 may generate personalized music 102 for output by the user device 110.

The music personalization and generation system 100 may be a system of one or more computers, one or more virtual machines executing on a system of one or more computers, and so on. Optionally, the music personalization and generation system 100 may represent a cloud-based system which receives information from multitudes of user devices. In this way, the music personalization and generation system 100 may generate personalized music for each user. The user device may represent a mobile device utilized by the user, a wearable device, a laptop, and so on. As illustrated, the user device 110 may execute a music application 112 to output personalized music 102 to the user of the user device 110. Optionally the music application 112 may be an application obtained from an electronic application store (e.g., an 'app'). Optionally, the user of the user device 110 may utilize a browser to access the music application 112. In these embodiments, the music application 112 may represent a web application executing, at least in part, via an outside system. In some embodiments, the music personalization and generation system 100 may execute a web application from which the user music application 112 is configured to receive personalized music 102.

As described above, the hearing information 114 may represent hearing capabilities, or hearing ailments, associated with the user of the user device 110. The hearing information 114 may be determined based on one or more hearing tests performed by the user. For example, the user may utilize the user device 110 to perform a hearing test. An example hearing test may output audio to the user via the user device 110, and the user may provide user input indicating whether the output audio was heard. Another example hearing test may present a set of numbers in a user interface. This example hearing test may then output audio indicating particular numbers for the user to select via the user device 110. The output audio may increasingly be obfuscated, such as via increasing background noise or chatter. Based on received selections, for example an accuracy associated with correct selections of numbers, the example hearing test may identify hearing capabilities, deficiencies, ailments, and so on.

In addition to the above-described hearing tests, the hearing information 114 may represent information determined by a medical professional. For example, the user of the user device 110 may indicate particular hearing ailments as diagnosed by a medical professional. As an example, the music application 112 may present a user interface identifying example hearing ailments. The user may then select from among the hearing ailments. Additionally, the user interface may enable specification of particular information associated with a hearing ailment. With respect to tinnitus, the user may indicate a particular tone or frequency spectrum associated with the user's tinnitus. The user may also indicate a particular threshold frequency, or frequency range, for which the user has reduced, or enhanced, hearing. In some embodiments, the system 100 may access medical history information associated with the user. In all situations in which medical information is utilized, the user may be required to affirmatively indicate consent to utilization. Additionally, the medical information may be obfuscated, such as to remove all protected health information (PHI).

Based on the received hearing information 114, the music personalization and generation system 100 may identify constraints associated with generating personalized music 102. For example, the user of the user device 110 may be determined to have tinnitus. In this example, the music personalization and generation system 100 may identify that the personalized music 102 is to include, or at least musically comport with, a tone associated with the user's tinnitus. Thus, the personalized music 102 may be perceived as comfortable to the user. The music personalization and generation system 100 may optionally instead identify that the personalized music 102 is not to include the tone, for example as therapy to address the user's tinnitus.

As another example of a constraint, the user of the user device 110 may be determined to have limited hearing capability above a certain frequency. In this example, the music personalization and generation system 100 may determine that personalized music 102 is not to include musical elements greater than this frequency. As will be described, the music personalization and generation system 100 may generate personalized music 102 utilizing machine learning techniques. Thus, the music personalization and generation system 100 may, in some embodiments, not merely generate music and then remove musical elements greater than this frequency. For example, the music personalization and generation system 100 may not merely generate music, and then utilize one or more rules to shift musical elements to a lower frequency range. Instead, and as an example, the machine learning techniques may be trained to incorporate any hearing constraints as an input. Thus, if the user has difficulty hearing at greater than the above-described frequency, the personalized music 102 may be generated at the outset to address this frequency limitation. For example, the personalized music 102 may comprise simulated music from instruments with registers below the frequency. In this way, the generated music may appear more natural to the user of the user device.

In some embodiments, the music application 112 may receive pre-recorded music based on input received from the user. For example, the music application 112 may output music obtained from the music streaming system 120. In these embodiments, the music application 112 may therefore be capable of responding to specific selections of artists or songs. Advantageously, the music application 112 may include a user interface element, or toggle, to select either receiving user-selected songs or receiving personalized music 102. Thus, it may be appreciated that if the user suffers an acute tinnitus attack, then the user may rapidly toggle to personalized music 102 as generated by the system 100.

In an effort to ensure that the personalized music 102 is enjoyable to the user of the user device 110, the music personalization and generation system 100 may identify a style preference for the user. As described herein, a style preference may be indicative of musical preferences of the user. In the example of FIG. 1, the music personalization and generation system 100 receives listening information 122 from one or more music streaming platforms. Examples of listening information 122 may include playlists created by the user, playlists subscribed to by the user, specific songs or artists selected by the user, and so on. As will be described, this listening information 122 may be analyzed to ascertain musical preferences.

As illustrated, the music personalization and generation system 100 may receive authentication information 116 from the user device 110. The authentication information 116 may include a user name/password associated with the user, an authentication token (e.g., an OAuth token), and so on. Optionally, the music personalization and generation system 100 may obtain information from a user profile associated with the user. For example, the user may create a user profile accessible to the system 100. The user may then include authentication information 116 associated with a music streaming platform utilized by the user. In some embodiments, the user may indicate that the system 100 is authorized to receive listening information 122 from a music streaming platform. Thus, the music personalization and generation system 100 may store authentication information received from a music streaming platform indicating authorization to obtain (e.g., read) the user's listening information 122.

FIG. 1 illustrates an example playlist 124 being stored by a music streaming system 120 associated with an example music streaming platform. The example playlist 124 may represent a playlist created, or subscribed to, by the user utilizing an application associated with the platform (e.g., a web application, a mobile application, and so on). Information included in the playlist 124 may be provided to the music personalization and generation system 100. Example information may include an indication of the songs included in the playlist 124 (e.g., song title, artist name, and so on). Example information may further include an indication of metadata associated with the songs. For example, a genre of the song and/or artist may be included in the listening information 122. Example information may further include an indication of a different user who created the playlist. The music personalization and generation system 100 may optionally utilize style preferences of the different user to inform style preferences of the user of the user device 110. Optionally, the different user may be an artist on the streaming music platform. The user may have subscribed to this artist's playlist, and the music personalization and generation system 100 may utilize genre or style information associated with the artist.

To determine a style preference of the user, the music personalization and generation system 100 may utilize the received listening information 122 described above. For example, the music personalization and generation system 100 may aggregate songs the user has listened to within a threshold amount of time. The aggregated songs may be utilized by machine learning techniques to determine a style preference. For example, the style preference may represent a weighted, or learned, combination of the genres represented in the aggregated songs. Thus, if the user mainly listens to folk music, but occasionally listens to heavy metal, the music personalization and generation system 100 may determine the style preference as an aggregated version of folk music and heavy metal.

The music personalization and generation system 100 may also select the style preference based on a most listened to genre of music in the listening information 122. For example, if a measure of central tendency of a certain genre exceeds a threshold, the music personalization and generation system 100 may set the genre as the style preference. Optionally, the music personalization and generation system 100 may utilize a threshold number of prior songs to inform the determination. Optionally, the user may indicate that only certain playlists, songs, or artists, are to be utilized by the music personalization and generation system 100 when determining the user's style preference. For example, the user may occasionally listen to classical music, but may not prefer that symphonic music be output to the user.

Optionally, the style preference may be based on information received from the user during, or related to, playback of personalized music 102. For example, the user may listen to personalized electronic music which is generated based on the user's hearing information 114. In this example, the user may utilize the music application 112 to provide feedback information. For example, the user may indicate that the user likes, or dislikes, the received electronic music. Based on this feedback information, the music personalization and generation system 100 may supplement the listening information 122 received from the music streaming system 120. In this way, the system 100 may determine that the user does not prefer to receive electronic music as generated by the system 100. The system 100 may also utilize the feedback to adjust (e.g., re-train, at least in part) one or more machine learning models. In this way, the system 100 may learn to generate personalized music 102 which better adheres to the user's preferences.

In some embodiments, the style preference may comprise a data structure (e.g., a vector) in which musical style information is encoded. For example, the vector may indicate weights or values associated with different musical styles (e.g., musical genres). As another example, the vector may represent a learned encoding in a musical feature space. For example, a machine learning model may ingest listening information from multitudes of users. The machine learning model may learn to encode the listening information into a feature space. In this way, the music personalization and generation system 100 may utilize an encoded vector for the user as an input to the machine learning techniques described herein.

As will be described in more detail below, with respect to FIG. 2, the music personalization and generation system 100 may then generate personalized music 102 for the user. In some embodiments, the music personalization and generation system 100 may generate personalized music 102 based on the hearing information 114 and style preference associated with the user. For example, a machine learning model, such as a recurrent or convolutional neural network, may accordingly generate music. In some embodiments, the musical personalization and generation system 100 may utilize one or more musical cues as an input to a machine learning model. For example, the system 100 may utilize a portion of pre-recorded audio associated with a style preference of the user. In this example, if the style preference indicates that the user listens to jazz, then the system 100 may select a pre-recorded portion of audio representing jazz. The system 100 may additionally select a musical score, such as written in MIDI notation, representing jazz. The system 100 may then generate personalized music 102 utilizing the above-described musical cue as an input from which the model may expand upon.

The user device 110 may then receive, and output, the personalized music 102. In this way, the user of the user device 110 may receive music customized for the user's physiological hearing responses and optionally the user's style preference.

While FIG. 1 described the user device 110 receiving personalized music 102, it may be appreciated that the user device 110 may generate the personalized music 102. For example, the music application 112 may include one or more machine learning models which may be utilized to generate the music 102. The music application 112 may store the weights, biases, hyperparameters, and so on, which are associated with the machine learning models. Thus, the music application 112 may perform a forward pass of a machine learning model utilizing the user's hearing information and style preference as an input. In this way, the personalized music 102 may be generated 'offline' such that the user device 110 may output music while lacking an internet connection. Furthermore, bandwidth associated with utilization of a cellular connection may be reduced or eliminated.

Figure 2:
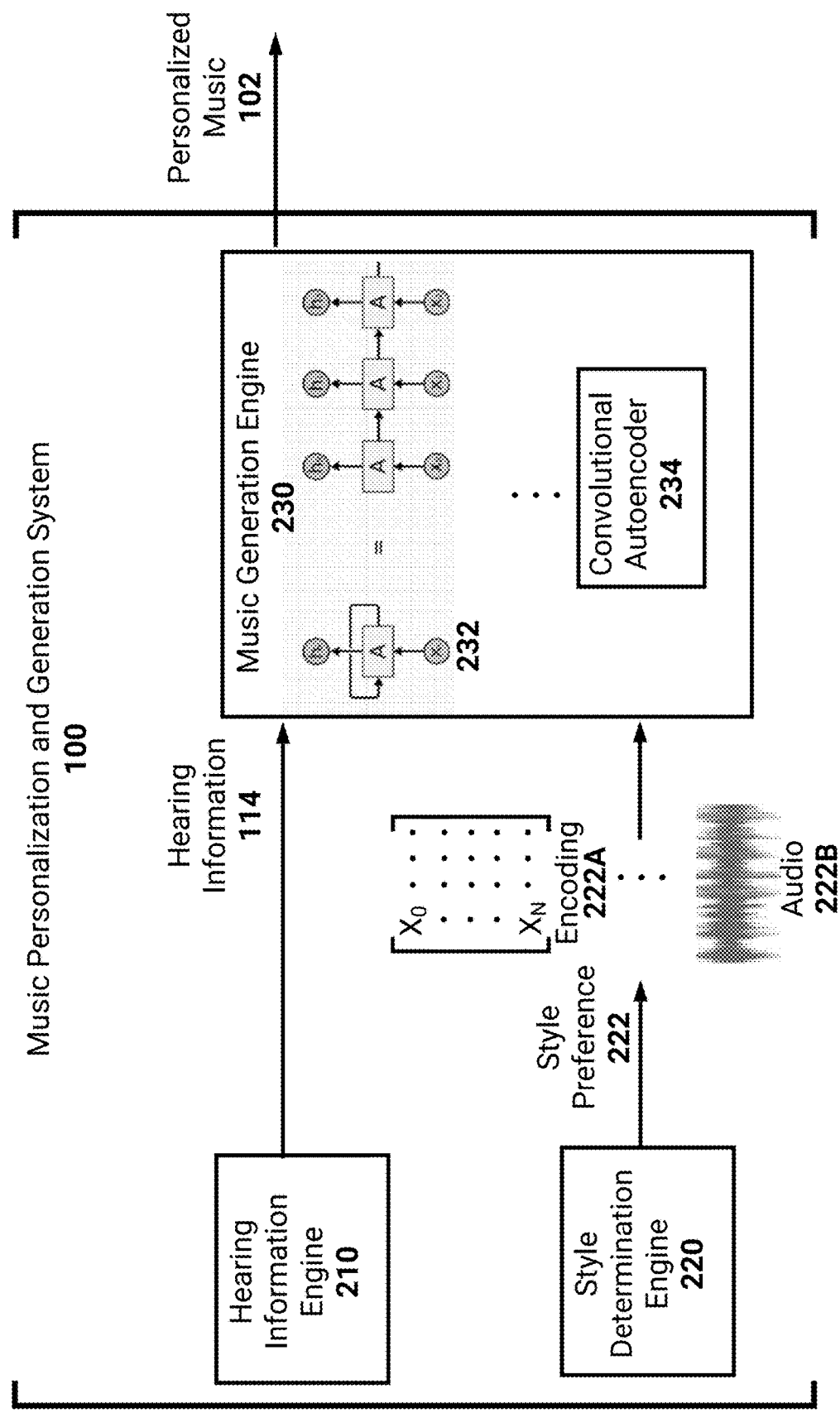
FIG. 2 is a block diagram illustrating details of the example music personalization and generation system.

FIG. 2 is a block diagram illustrating details of the example music personalization and generation system 100. As described above, the music personalization and generation system 100 may generate personalized music 102 based on hearing information 114 associated with the user. As described herein, the hearing information 114 may inform hearing capabilities of the user. As will be described, the hearing information 114 may be utilized by as an input to one or more machine learning models. These machine learning models may then generate personalized music 102. Examples of machine learning models are described below; however, it may be appreciated that additional, or alternative, machine learning techniques may be leveraged.

To determine hearing information 114 for the user, the music personalization and generation system 100 includes a hearing information engine 210. As described in FIG. 1, the music personalization and generation system 100 may determine constraints associated with a user's hearing. For example, the user may perform one or more hearing tests to identify the user's hearing capabilities. The hearing information engine 210 may obtain information from the user and store the information to be utilized as an input to one or more machine learning models. Optionally, the hearing information engine 210 may convert the obtained information into a form usable by a machine learning model. For example, the hearing information engine 210 may generate a data structure which encodes the received information. As an example, the data structure may include values or weights associated with different hearing ailments, capabilities, and so on. Thus, if the user has tinnitus then the data structure may indicate the existence of tinnitus and a tone, or frequency range, associated with the tinnitus.

The music personalization and generation system 100 may also include a style determination engine 220. The style determination engine 220 may access, or receive information from, music streaming platforms utilized by a user. The style determination engine 220 may also obtain, or receive, playlists associated with music stored by the user. For example, the user may have local storage, or networked storage, which stores albums, songs, and so on, to which the user listens. In some embodiments, the user may specify styles or genres of music of interest to the user. For example, the user may utilize a user interface to select, or specify, styles. Optionally, the user interface may be included in a music application 112 utilized to output personalized music 102. The user interface may optionally be presented via a web application associated with the music personalization and generation system 100.

As described in FIG. 1, the style determination engine 220 may determine a style preference 222 for the user. As an example, the style determination engine 220 may group a threshold number of songs or artists. For example, the threshold number may represent a threshold number of recently listened to songs or artists. As another example, the threshold number may represent a threshold number of the most listened to songs or artists. The style determination engine 220 may then designate this group as the style preference 222 of the user.

With respect to the above grouping, the style determination engine 220 may determine features associated with the songs or artists included in the group. As an example, the style determination engine 220 may assign a weight to each of multiple genres represented in the group. This weight may, in some embodiments, represent a multi-hot encoding of the genres. As another example, the style determination engine 220 may determine features associated with the songs. For example, the features may indicate style information, such as tempo, key or chord changes, sequences of notes which are utilized, scales utilized, instruments which are represented, and so on. In some embodiments, the group of songs or artists may be provided to a machine learning model which may generate a learned representation or encoding of the style preference 222.

In some embodiments, the style preference 222 may be learned by the style determination engine 212 based on feedback from the user. For example, the system 100 may provide personalized music 102 to the user based solely, or substantially, on the user's hearing information 114. Since this generated music may be of a random style, the user may provide feedback regarding the received music. For example, the system 100 may utilize a random input to a machine learning model representing a style preference 222. Based on feedback received from the user, the system 100 may adjust the input to incorporate the feedback. Thus, over time the system 100 may learn the user's style preference 222. In some embodiments, the user may provide an initial selection of a style preference 212. For example, the user may indicate that the user prefers to listen to hip-hop. In this example, the system 100 may set the style preference 212 as corresponding to hip-hop. The system 100 may then generate personalized music 102 in accordance with this style preference 212. As the user provides feedback, the system 100 may similarly adjust the style preference 212.

The music personalization and generation system 100 further includes a music generation engine 230. The music generation engine 230 may utilize received hearing information 114 to generate personalized music 102. In some embodiments, the music generation engine 230 may generate personalized music 102 solely, or substantially, based on the hearing information 114 as an input. For example, as described above, the engine 230 may generate music without having access to a style preference 212 of the user. Thus, the system 100 may be capable of outputting personalized music 102 which comports with a user's hearing capabilities.

The music generation engine 230 may utilize example machine learning models, such as a recurrent neural network 232 or a convolutional autoencoder 234 to generate the personalized music 102. With respect to a recurrent neural network 232, the network 232 may be trained to generate music based on, at least, an input identifying hearing information 114. The input may further include musical information, such as an encoding of differing types of music. During training, the weights, biases, and so on, associated with the recurrent neural network 232 may be updated to generate realistic adjustments of the musical information based on the hearing information 114. Thus, the recurrent neural network 232 may learn to incorporate the hearing information 114 from, as an example, first principles. In this way, if the user is unable to hear frequencies within a certain frequency range, then the recurrent neural network 232 may learn that certain instruments which typically play in this frequency range should be avoided. The network 232 may instead learn that a different instrument should be supplemented. Similarly, the convolutional autoencoder 234, such as an autoencoder which utilizes WaveNets, may be trained utilizing hearing information 114 and input audio waveforms. The input audio waveforms may represent recorded audio, such as real-life performances or MIDI audio, of disparate musical styles. The convolutional autoencoder 234 may, as an example, be trained utilizing multiple autoencoder pathways, for example one per style or genre. The autoencoder 234 may similar learn to account for the hearing information 114.

Optionally, the system 100 may incorporate a style preference 212 to generate personalized music 102 in a same, or similar style as that preferred by the user. For example, the style preference 212 may be represented as an encoding 222A. In this example, the style preference 212 may be a learned encoding of the user's style preferences with respect to a musical feature space. As another example, the style preference 212 may be represented as an audio waveform 222B. In this example, the style preference 212 may represent an audio waveform 222B associated with a particular musical style or an aggregation of musical styles. For example, the audio waveform 222B may be generated to combine the user's style preferences.

In the example of a musical encoding 222A, the encoding 222A may be discretized into one or more example forms. The musical encoding 222A may thus represent an abstraction of the user's style preference 212. For example, the encoding 222A may represent a multi-hot encoding of the user's style preferences as determined by the style determination engine 220. In the example of an audio waveform 222B, the waveform 222B may comprise musical information from the user's style preference 212. As an example, if the user listens to jazz and hip-hop, then the audio waveform 222B may represent a combination of audio associated with jazz and hip-hop. In some embodiments, the audio may represent a combination of pre-recorded audio associated with jazz and hip-hop. In some embodiments, the audio may represent an audio version of MIDI scores which are associated with jazz and hip-hop.

While not illustrated, in some embodiments it may be appreciated that the music generation engine 230 may utilize an input musical cue to expand upon. For example, if the user listens to jazz, then the music generation engine 230 may access a musical cue associated with jazz. This musical cue may represent a portion of pre-recorded jazz, or may represent a melody, theme, motif, and so on, associated with jazz. The music generation engine 230 may have access to multitudes of musical cues and select from among them. Optionally, the music generation engine 230 may generate these musical cues. As users listen to personalized music, the system 100 may receive feedback. Thus, certain musical cues may be determined to be preferred by end-users. These musical cues may be retained by the engine 230 and optionally adjusted according to one or more machine learning techniques.

As illustrated in FIG. 2, the style preference 222A may be utilized as an input to an artificial neural network 232 along with the hearing information 114. For example, a recurrent neural network 232, such as a network utilizing long short-term memory units or gated recurrent units, may receive the style preference 222A. This neural network 232 may then perform a forward pass through the units. As the received information is processed by the neural network 232, the network 232 may generate musical output. To ensure that long-term structure associated with generated output is maintained, the neural network 232 may leverage one or more techniques. Example techniques may include skip connections, utilizing attention, and so on. In this way, cohesive music may be generated. Optionally, one or more hand tuned models may be utilized to ensure that notes do not substantially vary in pitch or are not repeated too often.

As illustrated in FIG. 2, the style preference 222B may be utilized as an input to a different artificial neural network 234. For example, a convolutional autoencoder 234 may be utilized. The convolutional autoencoder 234 may comprise a multitude of convolutional layers. The received style preference 222B may be transformed from a time series through the convolutional layers. In some embodiments, the convolutional layers may represent WaveNet layers. The style preference 222B may be analyzed by the network 234 in view of the hearing information 114. The network 224 may then generate personalized music 102 for output by the system 100.

Figure 3:
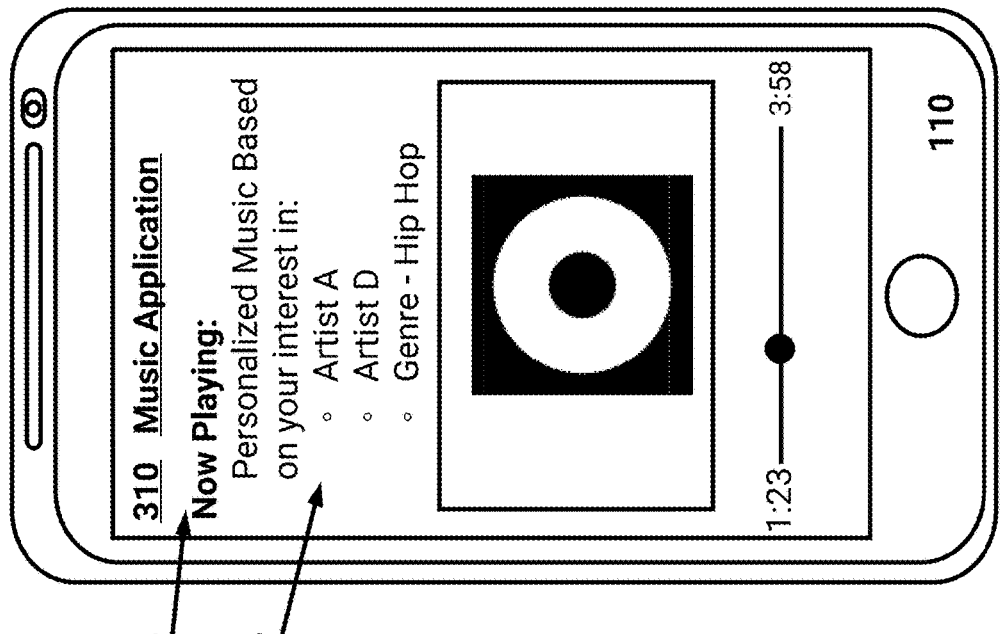
FIG. 3 is a block diagram of an example user device streaming music from an example streaming music platform.
Figure 3:
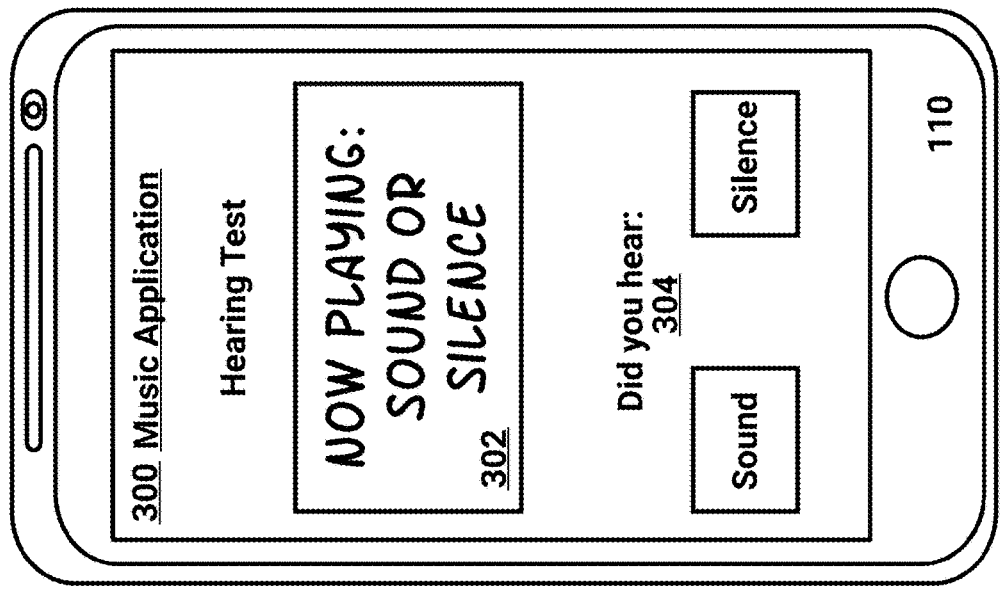

FIG. 3 is a block diagram of an example user device 110 streaming music from an example streaming music platform. As described above, the user device 110 may represent a mobile device, laptop, wearable device, and so on. In the example of FIG. 3, the user device is a mobile device executing a particular application. As described in FIG. 1, the particular application may enable performance of one or more hearing tests and may also enable output of personalized music. As described above, the particular application may enable the user to toggle between outputting personalized music 102 and outputting pre-recorded songs selected by a user.

While the example of FIG. 3 illustrates an example hearing test, it may be appreciated that additional, or alternative, hearing tests may be performed by the user. Additionally, the application described herein may provide either hearing test functionality or provide capability to receive personalized music.

User interface 300 illustrates an example hearing test being performed by a user of the user device 110. For example, the user interface 300 indicates in portion 302 that a sound may, or may not, be playing via the user device 110. The user interface 300 further includes selectable options 304 with which the user may specify whether the user heard a sound. It may be appreciated that the hearing test may then confirm whether the selection was correct. Based on a multitude of such selections, the hearing test may ascertain whether the user has one or more hearing ailments.

User interface 320 illustrates functionality associated with outputting personalized music, for example music received from the music personalization and generation system 100 described above. As illustrated, user interface 310 indicates that personalized music 312 is being output via the user device 110. Advantageously, the user interface 310 may indicate reasons for which the particular personalized music was generated. As an example, the user interface 310 may include a portion 314 identifying information associated with the user's style preference. In the example of FIG. 3, the portion 314 indicates that the user has been determined to listen to 'Artist A', 'Artist D', and the genre of hip-hop.

Optionally, the user may provide feedback via user interface 320. For example, the user may indicate that the user no longer prefers to listen to hip-hop. Instead, the user may indicate that a different genre of music should be utilized as the user's style preference. Additionally, the user may indicate that a different artist or song may be utilized in the user's style preference. In these embodiments, the user may provide user input (e.g., touch input, verbal input) to the user device 110 to provide the indication.

Example Flowcharts

Figure 4:
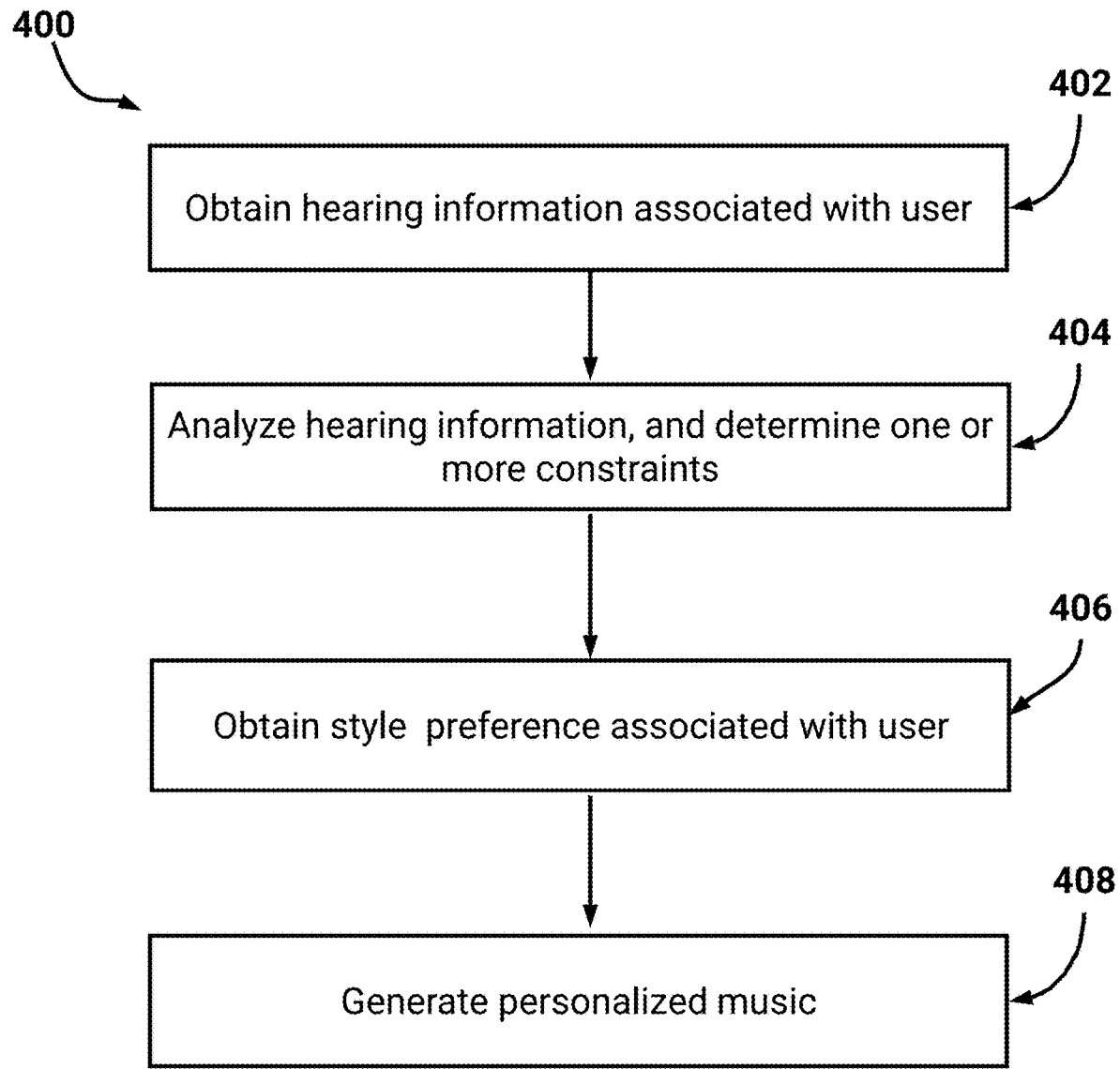
FIG. 4 is a flowchart of an example process for generating personalized music based on hearing information associated with a user.

FIG. 4 is a flowchart of an example process 400 for generating personalized music based on hearing information associated with a user. For convenience, the process 400 will be described as being performed by a system of one or more computers (e.g., the music personalization and generation system 100). In some embodiments, a user device of one or more processors (e.g., the user device 110) may perform one or more of the blocks described below.

At block 402, the system obtains hearing information associated with a user. As described above, the user may perform one or more hearing tests. For example, these hearing tests may be performed via an application, web page, and so on, on the user's user device. As another example, the user may perform a hearing test through a medical professional. With respect to an application, web page, and so on, the system may receive the information from the corresponding application or web page. As an example, the user may provide input to the application or web page confirming consent that the hearing information is to be provided to the system. Optionally, the user may specify the hearing information via an application associated with the system. For example, the user may view information determined by an application and enter the information in the application. With respect to a hearing test through a medical professional, the user may provide particular information extracted from a medical report. For example, the user may utilize an application associated with the system to enter hearing information. In this example, the user may indicate that the user has tinnitus, or is unable to hear a portion of a normal hearing frequency spectrum.

At block 404, the system analyzes the hearing information. As described in FIGS. 1-2, the system may determine constraints associated with the hearing information. For example, the system may determine that personalized music generated by the system is to include a tone associated with the user's tinnitus. Since this tone may not correspond with a generally accepted pitch standard, the system may determine that the generated music is to be adjusted to correspond to this tone. For example, the tone may be set as a note in a new pitch standard associated with the user. Thus, other notes in this new pitch standard may be set at respective intervals from the tone (e.g., according to a known standard, such as the diatonic scale).

As another example, the system may determine that particular instruments are to be utilized for certain musical styles. For example, if the user prefers to listen to classical, the system may determine that certain instruments are not to be utilized (e.g., piccolos). It may be appreciated that these instruments may be outside of the user's hearing range. Thus, instead the system may generate classical music which leverages other instruments.

At block 406, the system obtains style information associated with the user. The system may optionally determine a style preference for the user. This style preference may be utilized in combination with the hearing information to generate personalized music. For example, if the user is determined to prefer jazz, then the system may generate music in the style of jazz. Additional description related to determining a style preference is included below, with respect to FIG. 5.

At block 408, the system generates personalized music. The system may utilize the hearing information to generate music which comports with the user's hearing capabilities. As described above, the system may ensure that instruments, sounds, and so on, are within a frequency range able to be heard by the user. Since the system may leverage machine learning techniques, the resulting personalized music may be perceived as realistic. Thus, if the user is unable to hear a particular frequency spectrum, then the system may avoid this frequency spectrum. Advantageously, the system may ensure that this frequency spectrum is avoided in an intelligent manner. For example, the system may generate a melody outside of this spectrum, and supplement the melody utilizing instruments which, in general, produce sounds which are also outside of the spectrum. Thus, the resulting personalized music may appear natural to the user and not contrived (e.g., the melody may not appear unnatural due to simply relocating it in the frequency spectrum).

As described above, and described in FIG. 5 below, the system may determine a style preference for the user. For example, the style preference may represent an aggregation, or grouping, of songs or artists listened to the by user (e.g., within a threshold time period). In some embodiments, the user may select a particular style. Thus, if the user selects the style jazz, then the system may generate personalized jazz music. In some embodiments, the user may select a particular artist or song, and the system may generate personalized music similar to that of the artist or song.

Figure 5:
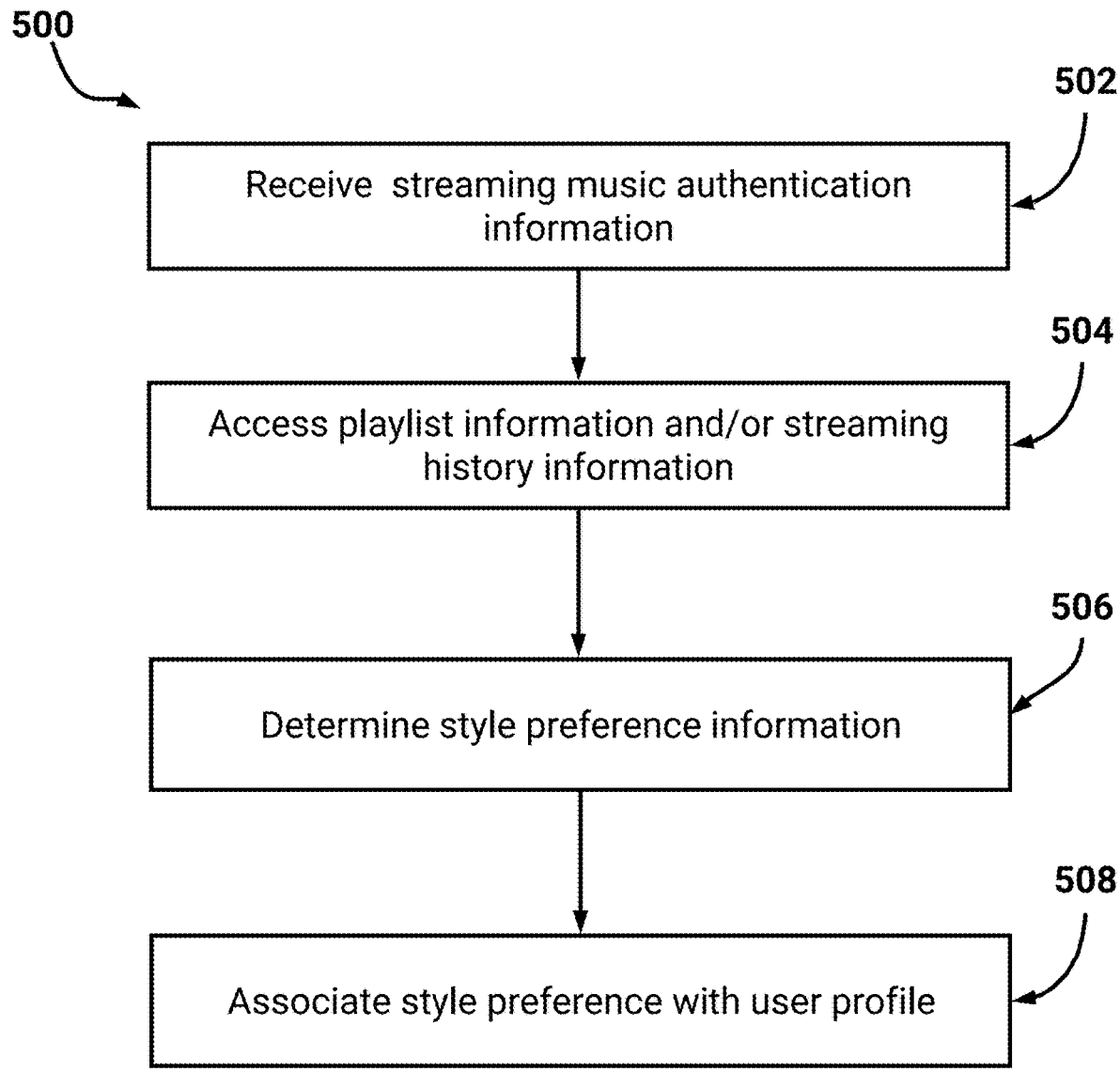
FIG. 5 is a flowchart of an example process for associating a determined musical style preference with a user.

FIG. 5 is a flowchart of an example process 500 for associating a determined musical style preference with a user. For convenience, the process 500 will be described as being performed by a system of one or more computers (e.g., the music personalization and generation system 100). In some embodiments, a user device of one or more processors (e.g., the user device 110) may perform one or more of the blocks described below.

At block 502, the system receives authentication information associated with one or more music streaming platforms. As described above, the user may provide a user name/password associated with the one or more music streaming platforms to the system.

At block 504, the system accesses listening information from the music steaming platforms. The system may receive playlist information, such as playlists the user has created utilizing the music streaming platforms. The system may also receive streaming history information, such as a recent, or the entirety of, listening history by the user.

At block 506, the system determines a style preference of the user. The system may utilize the listening information to determine a style or genre preference. This determined style preference may represent a model associated with styles of music to which the user listens. As described in FIGS. 1-2, the system may group recently listened to songs or artists together. The system may then generate the style preference based on this grouping. For example, the system may assign a weight or value for each of a multitude of musical styles. This assigned weight or value may then be utilized to generate personalized music for the user. In some embodiments, the system may identify a threshold number of styles to which the user listens. For example, these may represent a most commonly listened to number of styles. When generating personalized music, the system may then select from among the styles.

At block 508, the system associates the determined style preference with the user. Optionally, the system may store a user profile associated with the user. The style preference of the user may include in this user profile, such that he system may access the style preference when generating personalized music. Optionally, the system may periodically access listening information associated with the user and re-determine style preference information. The system may then associate the determined style preference with the user.

In some implementations, the system may utilize personalized music which has been generated for one or more other users. For example, instead of generating personalized music for each user, the system may identify one or more other users with similar hearing information to the user. In this example, the system may determine respective measure of similarity between users. As an example, the system may compute a measure of difference between hearing information (e.g., an L1 or L2 norm). Thus, the system may obtain personalized music for a similar user. The system may then provide the obtained personalized music to the user. In this way, if two users have similar hearing information, then the system may conserve processing resources associated with generating music.

Figure 6:
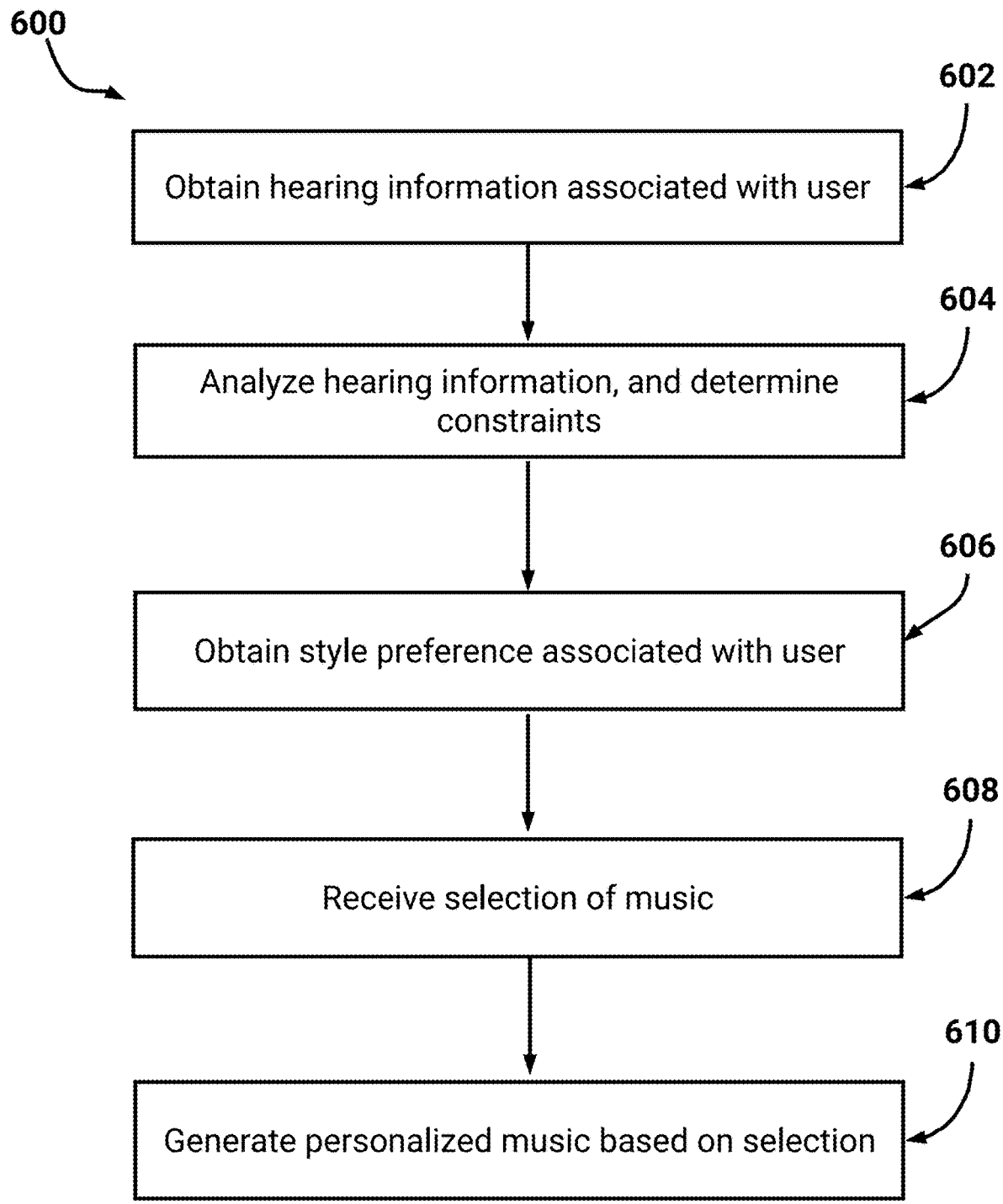
FIG. 6 is a flowchart of an example process for generating personalized music based on user selection of music.

FIG. 6 is a flowchart of an example process for generating personalized music based on user selection of music. For convenience, the process 600 will be described as being performed by a system of one or more computers (e.g., the music personalization and generation system 100). In some embodiments, a user device of one or more processors (e.g., the user device 110) may perform one or more of the blocks described below At block 602, the system obtains hearing information and at block 604 the system determines constraints. At block 606, the system obtains a style preference associated with the user.

At block 608, the system receives selection of music. Optionally, the system may receive a selection of a particular song. For example, the user may indicate that the user wants to listen to a pre-recorded song. This pre-recorded song may optionally represent associated with a known musical artist. As another example, the user may select from among songs generated by a composer associated with the system. For example, the system may store multitudes of songs generated by different composers, for utilization in generating personalized music. The system may optionally enable the user to hear clips, or portions, of the generated songs.

At block 610, the system generates personalized music based on the selection. With respect to a pre-recorded song, the system may ingest the audio associated with the song. The system may optionally convert the pre-recorded audio into an encoding which captures the musical notes, timing information, quality information (e.g., distortion information, indications of acoustical note quality, and so on). The system may then utilize machine learning techniques to adjust this received encoding based on the user's hearing information. For example, a recurrent neural network may generate output audio. As another example, the pre-recorded audio may be utilized by a convolutional autoencoder. In this example, the convolutional autoencoder may utilize an audio waveform associated with the pre-recorded audio to generate personalized music adjusted based on the user's hearing information.

With respect to a song generated by a composer associated with the system, the system may expand upon the song. For example, the song may represent a musical cue as described in FIG. 2. Thus, the system may utilize machine learning techniques to generate music in accordance with the user's hearing information. Additionally, the system may utilize the user's style preference to ensure that the generated music comports with the user's preferred musical style.

Overview of Computing Device

Figure 7:
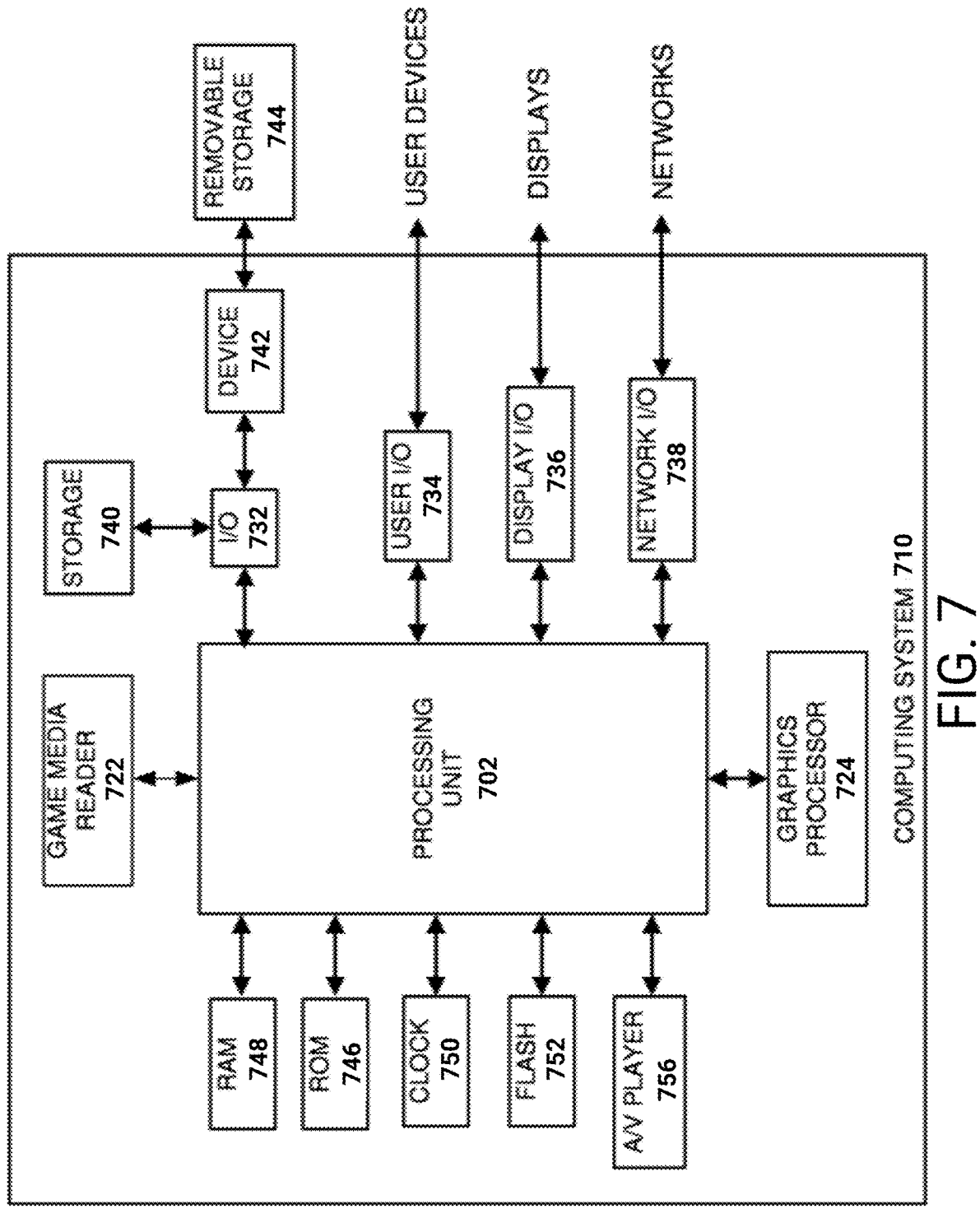
FIG. 7 illustrates an embodiment of computing device according to the present disclosure.

FIG. 7 illustrates an embodiment of computing device 710 according to the present disclosure. Other variations of the computing device 710 may be substituted for the examples explicitly presented herein, such as removing or adding components to the computing device 710. The computing device 710 may include a game device, a smart phone, a tablet, a personal computer, a laptop, a smart television, a car console display, a server, and the like. The computing device 710 may also be distributed across multiple geographical locations. For example, the computing device 710 may be a cluster of cloud-based servers.

As shown, the computing device 710 includes a processing unit 720 that interacts with other components of the computing device 710 and also external components to computing device 710. A game media reader 722 is included that communicates with game media 712. The game media reader 722 may be an optical disc reader capable of reading optical discs, such as CD-ROMs or DVDs, or any other type of reader that can receive and read data from game media 712. One or more of the computing devices may be used to implement one or more of the systems disclosed herein.

Computing device 710 may include a separate graphics processor 724. In some cases, the graphics processor 724 may be built into the processing unit 720. In some such cases, the graphics processor 724 may share Random Access Memory (RAM) with the processing unit 720. Alternatively or additionally, the computing device 710 may include a discrete graphics processor 724 that is separate from the processing unit 720. In some such cases, the graphics processor 724 may have separate RAM from the processing unit 720. Computing device 710 might be a handheld game application device, a dedicated game console computing system, a general-purpose laptop or desktop computer, a smart phone, a tablet, a car console, or other suitable system.

Computing device 710 also includes various components for enabling input/output, such as an I/O 732, a user I/O 734, a display I/O 736, and a network I/O 738. I/O 732 interacts with storage element 740 and, through a device 742, removable storage media 744 in order to provide storage for computing device 710. Processing unit 720 can communicate through I/O 732 to store data, such as game state data and any shared data files. In addition to storage 740 and removable storage media 744, computing device 710 is also shown including ROM (Read-Only Memory) 746 and RAM 748. RAM 748 may be used for data that is accessed frequently, such as when a video game is being played.

User I/O 734 is used to send and receive commands between processing unit 720 and user devices, such as game controllers. In some embodiments, the user I/O 734 can include a touchscreen input. The touchscreen can be capacitive touchscreen, a resistive touchscreen, or other type of touchscreen technology that is configured to receive user input through tactile inputs from the player. Display I/O 736 provides input/output functions that are used to display images from the game being played. Network I/O 738 is used for input/output functions for a network. Network I/O 738 may be used during execution of a game, such as when a game is being played online or being accessed online, application of fraud detection, and/or generation of a fraud detection model.

Display output signals produced by display I/O 736 comprise signals for displaying visual content produced by computing device 710 on a display device, such as graphics, user interfaces, video, and/or other visual content. Computing device 710 may comprise one or more integrated displays configured to receive display output signals produced by display I/O 736. According to some embodiments, display output signals produced by display I/O 736 may also be output to one or more display devices external to computing device 710.

The computing device 710 can also include other features that may be used with a video game, such as a clock 750, flash memory 752, and other components. An audio/video player 756 might also be used to play a video sequence, such as a movie. It should be understood that other components may be provided in computing device 710 and that a person skilled in the art will appreciate other variations of computing device 710.

Program code can be stored in ROM 746, RAM 748 or storage 740 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 740, and/or on removable media such as game media 712 (which can be a CD-ROM, cartridge, memory chip or the like, or obtained over a network or other electronic channel as needed). In general, program code can be found embodied in a tangible non-transitory signal-bearing medium.

Random access memory (RAM) 748 (and possibly other storage) is usable to store variables and other game and processor data as needed. RAM 748 is used and holds data that is generated during the execution of an application and portions thereof might also be reserved for frame buffers, application state information, and/or other data needed or usable for interpreting user input and generating display outputs. Generally, RAM 748 is volatile storage and data stored within RAM 748 may be lost when the computing device 710 is turned off or loses power.

As computing device 710 reads game media 712 and provides an application, information may be read from game media 712 and stored in a memory device, such as RAM 748. Additionally, data from storage 740, ROM 746, servers accessed via a network (not shown), or removable storage media 744 may be read and loaded into RAM 748. Although data is described as being found in RAM 748, it will be understood that data does not have to be stored in RAM 748 and may be stored in other memory accessible to processing unit 720 or distributed among several media, such as game media 712 and storage 740.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
by a system of one or more computers,
obtaining hearing information associated with a user's hearing capabilities, the hearing information indicating one or more constraints, and the hearing information being determined based on one or more hearing tests performed by the user;
receiving listening history information from one or more music streaming platforms, the listening history information indicating, at least, music playlists to which a user created or is subscribed;
determining, based on the listening history information, a style preference of the user, the style preference encoding style information associated with the listening history information; and
generating, utilizing one or more machine learning models, personalized music which expands upon a musical cue in accordance with the style preference, the personalized music being generated using the hearing information, wherein the personalized music comports with the constraints, and wherein the system is configured to provide the personalized music for output via a user device of the user.

2. The computer-implemented method of claim 1, wherein the hearing information indicates that the user has tinnitus, or wherein the hearing information indicates a frequency range associated with reduced hearing capability.

3. The computer-implemented method of claim 2, wherein the hearing information indicates that the user has tinnitus, and wherein generating personalized music comprises:
identifying, from the hearing information, a tone associated with the user's tinnitus; and
generating personalized music, such that the one or more machine learning models set the identified tone as a musical note for utilization in the personalized music.

4. The computer-implemented method of claim 3, wherein remaining musical notes utilized in the personalized music are associated with respective intervals from the identified tone.

5. The computer-implemented method of claim 2, wherein the hearing information indicates a frequency range, and wherein generating personalized music comprises:
selecting, via the one or more machine learning models, instruments associated with musical notes outside of the frequency range; and
generating personalized music utilizing the selected instruments.

6. The computer-implemented method of claim 1, wherein receiving listening history information comprises:
receiving, from a user device executing an electronic game, information indicating initiation of the electronic game;
obtaining authentication information associated with the user; and
requesting the listening history information utilizing the authentication information.

7. The computer-implemented method of claim 1, wherein determining the style preference comprises:
grouping a threshold number of songs identified in the listening history information; and
determining a data structure representing the style preference, the data structure comprising assigned weights to each of a plurality of musical styles,
wherein the data structure is provided as an input to the one or more machine learning models.

8. The computer-implemented method of claim 1, wherein the one or more machine learning models comprise a recurrent neural network or a convolutional neural network.

9. The computer-implemented method of claim 1, wherein the musical cue represents a portion of audio associated with the style preference or a musical score associated with the style preference.

10. A system comprising one or more computers and computer-storage media storing instructions that when executed by the one or more computers, cause the one or more computers to perform operations comprising:
obtaining hearing information associated with a user's hearing capabilities, the hearing information indicating one or more constraints, and the hearing information being determined based on one or more hearing tests performed by the user;
receiving listening history information from one or more music streaming platforms, the listening history information indicating, at least, music playlists to which a user created or is subscribed;
determining, based on the listening history information, a style preference of the user, the style preference encoding style information associated with the listening history information; and generating, utilizing one or more machine learning models, personalized music which expands upon a musical cue in accordance with the style preference, the personalized music being generated using the hearing information, wherein the personalized music comports with the constraints, and wherein the system is configured to provide the personalized music for output via a user device of the user.

11. The system of claim 10, wherein the hearing information indicates that the user has tinnitus, or wherein the hearing information indicates a frequency range associated with reduced hearing capability.

12. The system of claim 11, wherein the hearing information indicates that the user has tinnitus, and wherein generating personalized music comprises:
   identifying, from the hearing information, a tone associated with the user's tinnitus; and
   generating personalized music, such that the one or more machine learning models set the identified tone as a musical note for utilization in the personalized music.

13. The system of claim 12, wherein remaining musical notes utilized in the personalized music are associated with respective intervals from the identified tone.

14. The system of claim 10, wherein the hearing information indicates a frequency range, and wherein generating personalized music comprises:
   selecting, via the one or more machine learning models, instruments associated with musical notes outside of the frequency range; and
   generating personalized music utilizing the selected instruments.

15. The system of claim 10, wherein the one or more machine learning models comprise a recurrent neural network or a convolutional neural network.

16. Non-transitory computer storage media storing instructions that when executed by a system of one or more computers, cause the one or more computers to perform operations comprising:
   obtaining hearing information associated with a user's hearing capabilities, the hearing information indicating one or more constraints, and the hearing information being determined based on one or more hearing tests performed by the user;
   receiving listening history information from one or more music streaming platforms, the listening history information indicating, at least, music playlists to which a user created or is subscribed;
   determining, based on the listening history information, a style preference of the user, the style preference encoding style information associated with the listening history information; and
   generating, utilizing one or more machine learning models, personalized music which expands upon a musical cue in accordance with the style preference, the personalized music being generated using the hearing information, wherein the personalized music comports with the constraints, and wherein the system is configured to provide the personalized music for output via a user device of the user.

17. The computer storage media of claim 16, wherein the hearing information indicates that the user has tinnitus, or wherein the hearing information indicates a frequency range associated with reduced hearing capability.

18. The computer storage media of claim 17, wherein the hearing information indicates that the user has tinnitus, and wherein generating personalized music comprises:
   identifying, from the hearing information, a tone associated with the user's tinnitus; and
   generating personalized music, such that the one or more machine learning models set the identified tone as a musical note for utilization in the personalized music.

19. The computer storage media of claim 17, wherein the hearing information indicates a frequency range, and wherein generating personalized music comprises:
   selecting, via the one or more machine learning models, instruments associated with musical notes outside of the frequency range; and
   generating personalized music utilizing the selected instruments.

20. The computer storage media of claim 16, wherein the one or more machine learning models comprise a recurrent neural network or a convolutional neural network.

\* \* \* \* \*